United States Patent [19]

Bucci

[11] Patent Number: 5,109,645
[45] Date of Patent: May 5, 1992

[54] FRAME CONSTRUCTION SYSTEM
[75] Inventor: Carlo G. Bucci, Ontario, Canada
[73] Assignee: Repla Limited, Oakville, Canada
[21] Appl. No.: 530,056
[22] Filed: May 29, 1990

Related U.S. Application Data

[63] Continuation of Ser. No. 320,337, Mar. 8, 1989, Pat. No. 4,987,769.

[51] Int. Cl.⁵ .............................................. A47G 1/10
[52] U.S. Cl. ....................................... 52/656; 403/401
[58] Field of Search ................... 403/401, 402; 52/656, 52/582, 788, 712, 475, 476; 40/152

[56]  References Cited

U.S. PATENT DOCUMENTS

| | | | |
|---|---|---|---|
| 3,321,223 | 5/1967 | Snow | 52/656 |
| 3,356,403 | 12/1967 | Sak | 52/582 |
| 3,782,054 | 1/1974 | Goss | 40/152 |
| 4,090,799 | 5/1978 | Crotti | 52/656 |
| 4,453,855 | 6/1984 | Richter | 52/656 |
| 4,905,334 | 3/1990 | Oppenhuizen | 52/656 |

FOREIGN PATENT DOCUMENTS

| | | | |
|---|---|---|---|
| 8204191 | 5/1984 | Netherlands | 403/401 |
| 250299 | 6/1948 | Switzerland | 403/401 |
| 895149 | 5/1962 | United Kingdom | 403/402 |

Primary Examiner—John E. Murtagh

[57] ABSTRACT

A frame construction suitable for sash and frame constructions, including incorporation as a heavy duty construction for a rolling or sliding (patio) door, is provided with corner reinforcement and securement members to hold bevelled frame members in mutually secured relation. The preferred extruded frame section, being generally of aluminum, has an enclosed rectangular or other hollow, shaped profile between the opposed side flange members of the section. A symmetrical shaped metal angle piece or pieces is driven within the hollow core portion of the two hollow profile sections being joined. The angle pieces have resilient, reversed end portions with sharp edged terminations, that slide freely on being entered within a respective section, due to the resilience of the angle pieces, but lock into engaged relation on attempted withdrawal, due to the reversed attitude of the resilient end portions and their associated sharp edges, to secure the sections against disassembly. The use of duplex angle pieces imparts enhanced flexural stiffness to the joints. Provision is made to enable disassembly of the joints. When plastic frames are thus joined, angle pieces of organic plastic may be used, being adhered in place by way of cement, or by solvent or sonic welding, for a permanent joint.

4 Claims, 5 Drawing Sheets

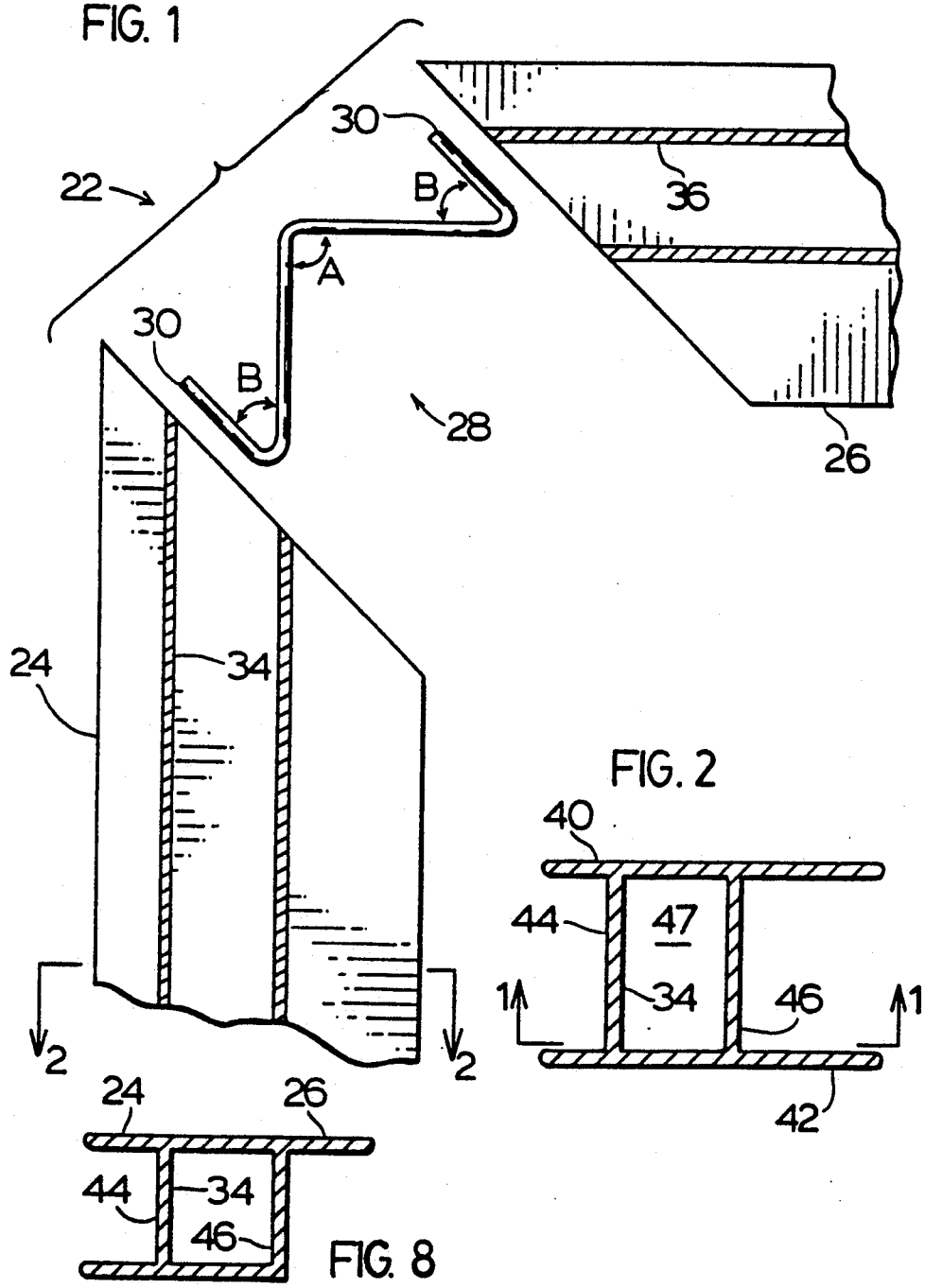

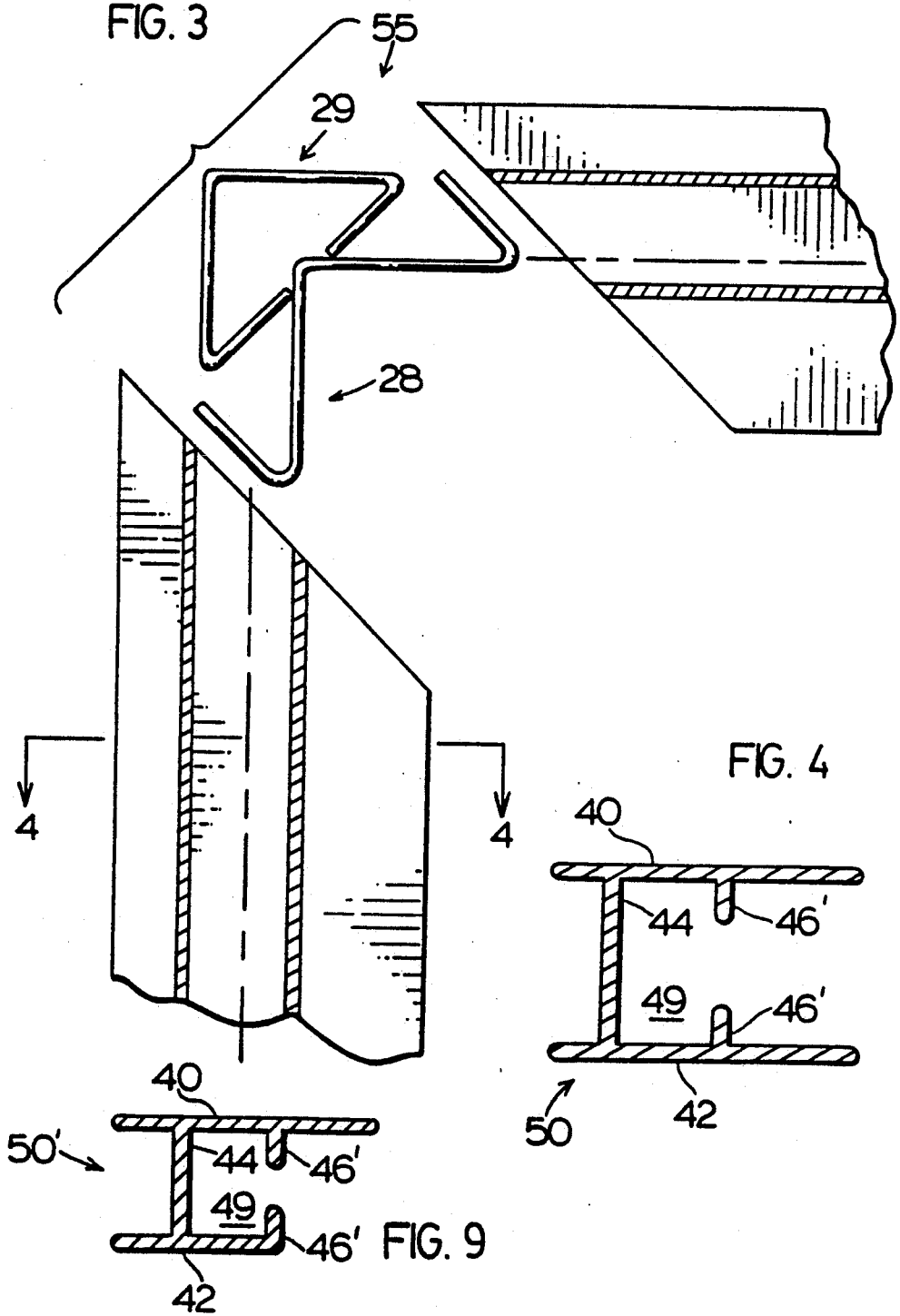

FRAME CONSTRUCTION SYSTEM

This application is a continutaion of application Ser. No. 07/320,337 filed Mar. 8, 1989 now U.S. Pat. No. 4,987,709.

FIELD OF THE INVENTION

This invention is directed to a structural joint and in particular to a frame structural corner particularly suited for joining extruded sections, such as door leaf frames.

BACKGROUND OF THE INVENTION

Extruded sections, particularly of plastic or aluminum, as well as roll formed plastic, aluminum and other sheet metal profiles enjoy widespread use, due to their weight advantage and ready availability. In their use, for fabricating sliding or rolling patio doors for instance, the joining of the corners for the assembly and disassembly of a high quality aluminum product entail the use of threaded fasteners which are labour intensive. Furthermore, the capability of unwarranted or accidental disassembly always exists, which is not necessarily desirable.

SUMMARY OF THE INVENTION

The present invention provides a frame construction of extruded, roll formed or fabricated profile section having interconnecting corner members permitting permanent connection by sliding assembly.

In a preferred embodiment of this invention there is provided a joint for joining a first frame member to a second frame member, wherein the frame members are of profiled hollow section terminating in mutually bevelled planar relation, with complementary angles of bevel to form a joint having a predetermined angle between the members thereof. The profile sections form mutually inclined channels having wall portions of the respective channels in mutual, substantially adjoining relation; a joining member for insertion within the channels in oriented relation therein; the joining member having a first pair of leg portions mutually inclined to enter a respective channel, each leg portion having a reversely inclined foot portion extending in inclined relation across that channel, the joining member leg portions being slideable axially within the respective channel, having an inclined edge portion of each foot portion engaging an inner surface wall portion of the respective channel, to preclude withdrawal of each leg portion from the respective channel, thus retaining the frame members in secured, joined relation.

The leg portions of the joining member are located in joining relation between two adjoining wall portions of the respective channels.

Each of the noted mutually inclined channels of the frame members has laterally opposed side wall portions substantially defining the thickness of the respective frame member and at least one transverse wall portion extending laterally in joining relation between the side wall portions; and at least one other channel-defining transverse wall portion extending in spaced relation from the above referred to transverse wall, to contain the joining member in oriented, secured relation within the channel.

In the preferred embodiment the frame members are of extruded section channel being substantially rectangular, and are closed rectangles.

It will, however, be understood that continuous frame units of hollow profile may include tubular, round, oval, rectangular or other configurations, which may be extruded in plastic, aluminum or other ferrous or non-ferrous metals. Such profile sections may be roll-formed, brake bent or press formed.

Alternative embodiments are contemplated wherein the channel sections comprise an open channel having three walls thereof in mutual joined relation in the form of a U-shape and a fourth wall portion located in partial closing relation with the mouth of the U-shape, so as to contain the joining member when inserted therein in transversely constrained relation, with the respective foot edge portion thereof constituting a cutting edge held in compressed engaging relation with an inner surface portion of one of the channel walls.

The preferred frame construction generally comprises extruded section forming the frame members, positioned substantially at right angles to each other and having transversely extending first wall portion of the channels at the juncture thereof in mutual adjacent relation, with leg portions of a joining member extending along the channel wall portions and held in flush contacting relation with the respective first wall portions by reaction forces generated by the respective foot portions of the joining member in contacting relation with section wall interior surface portions, against which the inclined edge portion of a respective foot portion bear in engaging relation therewith.

In assembly of a patio door having its frame members at right angles to each other, a subject frame can be assembled, a corner joint at a time to form a U-shape, and the closing frame member, having a joining member inserted within each end thereof can then be readily slid into place to complete the frame.

Disassembly of the frame is made possible by the provision of access slots, permitting the insertion of a tool, for disengaging the cutting edge of the foot edge portion of the joining member.

It has been found in the case of the frame joining members that the use of a stainless steel strapping appropriately sized in width to slide readily within the extruded frame section, and of a thickness to provide stiff foot and leg portions, having the ends of the foot portions sheared normal thereto, provides a substantially perfect anchoring action, in that the sheared edge, while sliding readily inwardly along the inner surface of an extruded aluminum channel due to its reversely inclined attitude, to enable comparatively easy hand insertion therein, constitutes a cutting edge that abruptly digs into the aluminum or plastic surface in anchoring relation thereto upon attempted reverse movement of the joining member along the section channel. The joining member has no observable lost motion in this regard, so that a tight permanent joint is effected.

In the case of plastic frame sections utilizing plastic joining members a permanent joint is achieved using glue or solvent welding or ultra-sonic welding.

It will also be understood that frame configurations, while most frequently of rectangular form, may as readily be triangular, polygonal or of other geometric configuration.

BRIEF DESCRIPTION OF THE DRAWINGS

Certain embodiments of the invention are described, which are for purposes of illustration and not in any sense of limitation, reference being made to the accompanying drawings, wherein:

FIG. 1 is a front elevation sectioned as at 1—1 of FIG. 2, of a frame corner joint having the components thereof in exploded relation;

FIG. 2 is a section taken at 2—2 of FIG. 1;

FIG. 3 is a view similar to FIG. 1, showing a modified embodiment;

FIG. 4 is a section taken at 4—4 of FIG. 3;

FIG. 8 is a view similar to FIG. 2 showing a modified section embodiment;

FIG. 9 is a view similar to FIG. 4 of a further section embodiment;

DETAILED DESCRIPTION OF THE EMBODIMENTS

Figure 6:
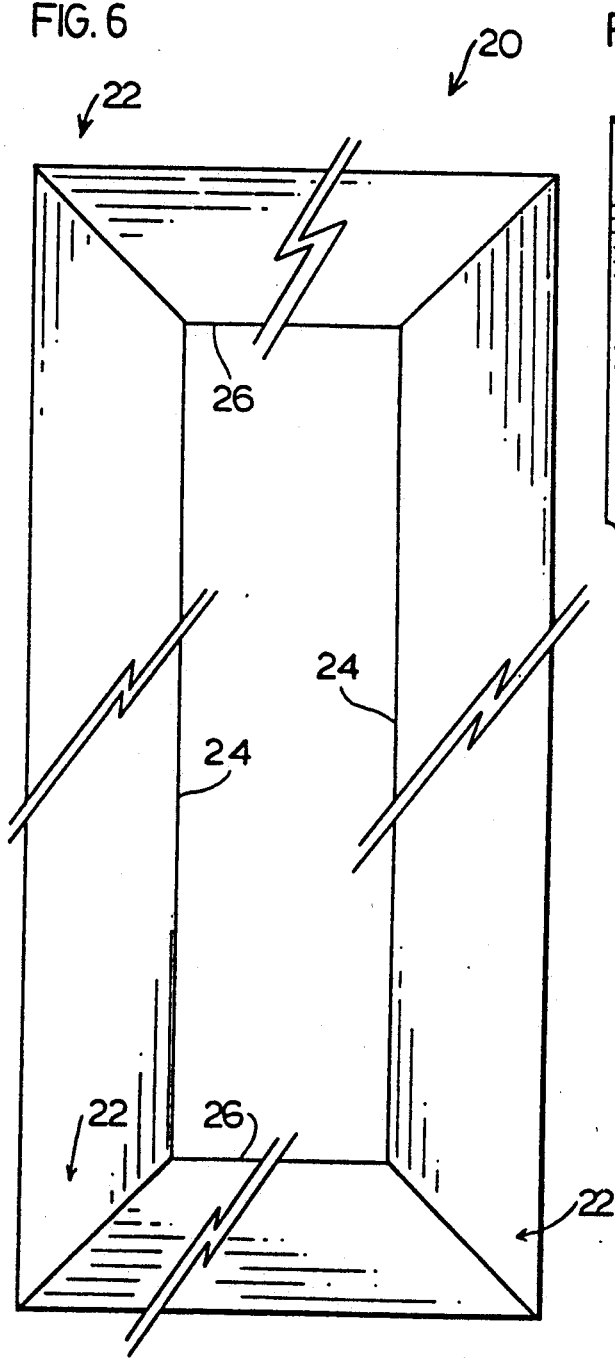
FIG. 6 is a schematic elevation of a frame (foreshortened)

Referring to FIGS. 1 and 6, frame 20 has corner assemblies 22, at the juncture of frame side members 24,24 and upper and lower rail members 26,26.

A joining member 28 serves to secure the rail 26 and frame side member 24 in permanently secured relation.

The joining member 28 is of an open W-form, the angle A being substantially 90%, the angles B generally being about 45%. While not critical, the angle B requires to be less than 90%, and to be such that the sheared edges 30 make effective cutting contact with the respective inner surfaces 34,36 of the members 24,26.

Referring to FIGS. 1 and 2 the side members 24,26 each comprise an extruded section, the section having side plate portions 40,42, with transversely extending web members 44,46 in joining relation therebetween.

Figure 5:
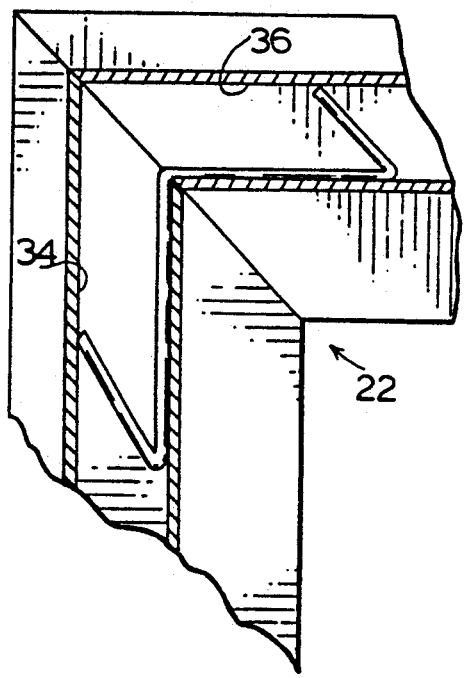
FIG. 5 is a view corresponding to FIG. 1, having the frame corner in assembled relation.

It will be understood that the channel 47 thus formed will constitute a continuous, totally enclosed channel extending about the frame 20, having the respective channel wall members in adjoining relation (see FIG. 5).

FIG. 8 illustrates a similar but modified section profile.

In the FIG. 3, FIG. 4 and FIG. 9 embodiments, the sections 50,50, constitute open channels, having side walls 40,42 web wall 44, and partial web walls 46.

Also illustrated is a reinforcement member 29 which complements and braces the joint member 28 and also improves the lateral flexural stiffness of the joint assembly 55.

Figure 7:
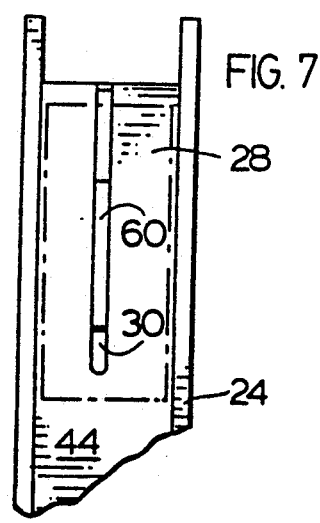
FIG. 7 is an end elevation of the joint of FIG. 5.

FIG. 7 shows one form of access slot 60 in the web wall 44 by means of which the cutting edge 30 of joining member 28 can be pried inwardly and released from jamming engagement with the inner surface 34 of web wall 44.

In order to assemble the frame 20 of FIG. 6 two of the joints 22 can be assembled individually. Alternatively, the connectors 28 can be fully inserted into both ends of a frame member such as bottom rail 26 and, with side members 24 suitably located in spaced mutually parallel, oriented relations, the free legs of connectors 20 can be slid into the respective channels 47 and the rail 26 tapped fully into closing relation with the side members 24. The other rail 26, namely the top rail 26 is then similarly assembled to the side members 24, and the frame 20 is thus completed. Alternatively, the first two joints 22 can be made individually, if so desired. It is the last two joints that require to be assembled simultaneously.

Referring to FIG. 11, these six additional section profiles are illustrative of further sections that may be used, in practicing the invention.

Figure 10:
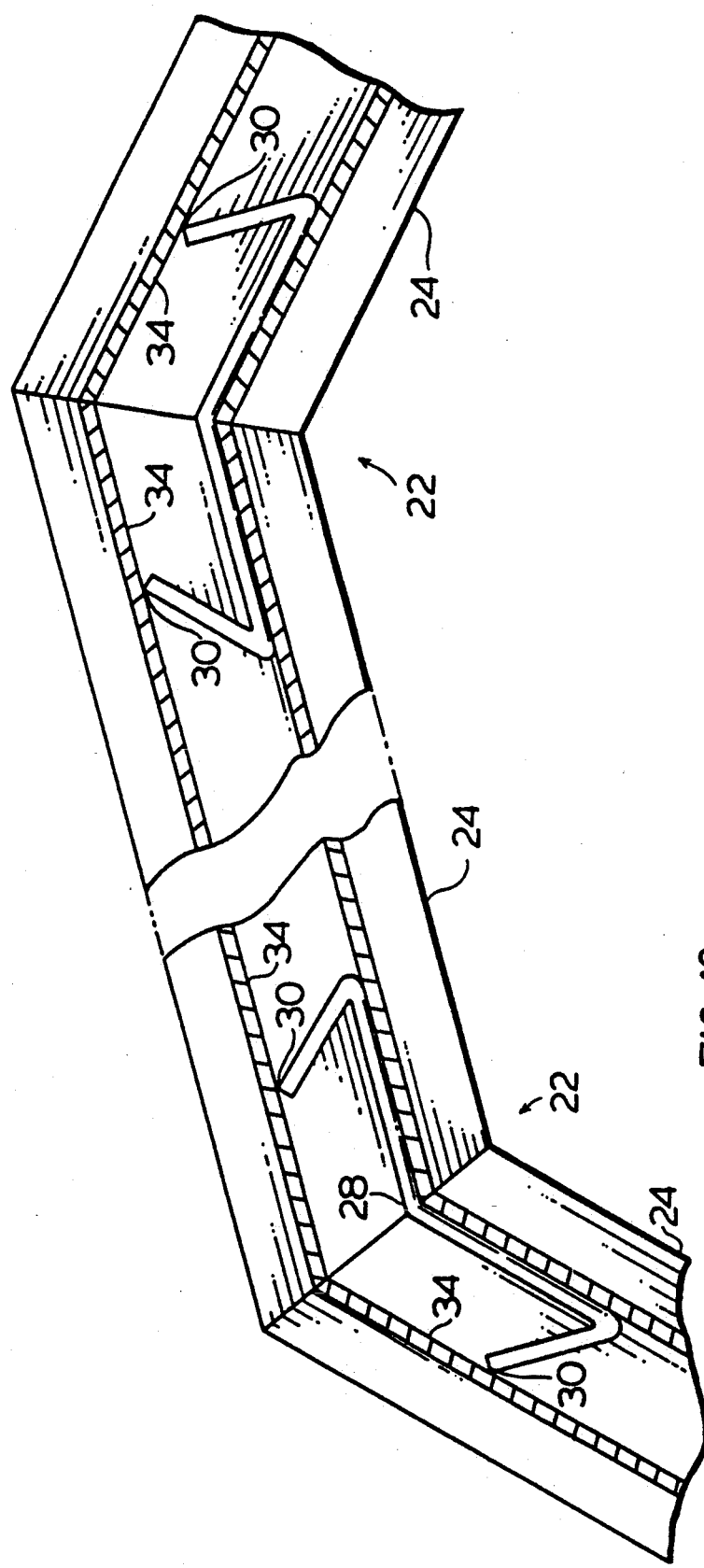
FIG. 10 is a view similar to FIG. 5 of a portion of a polygonal frame construction.
Figure 11A:
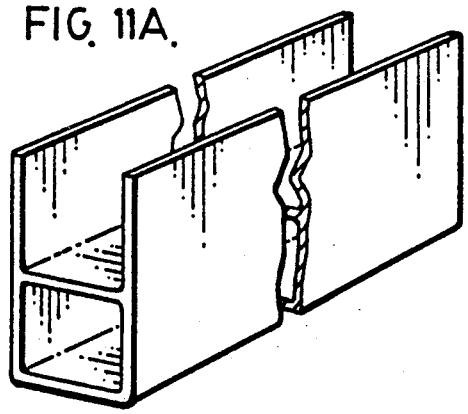
FIGS. 11a, 11b, 11c, 11d, 11e and 11f illustrate alternative profile sections that may be utilized in carrying out the invention.
Figure 11B:
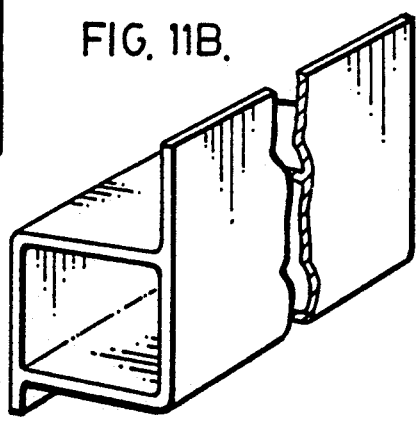
Figure 11C:
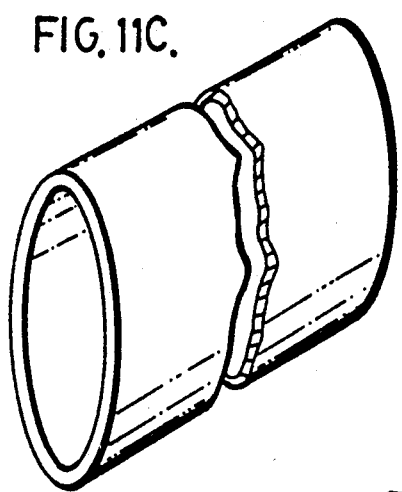
Figure 11D:
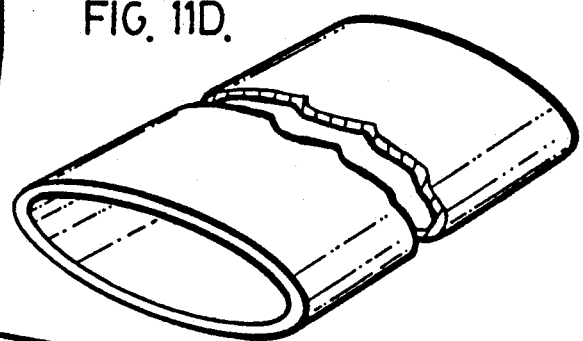
Figure 11E:
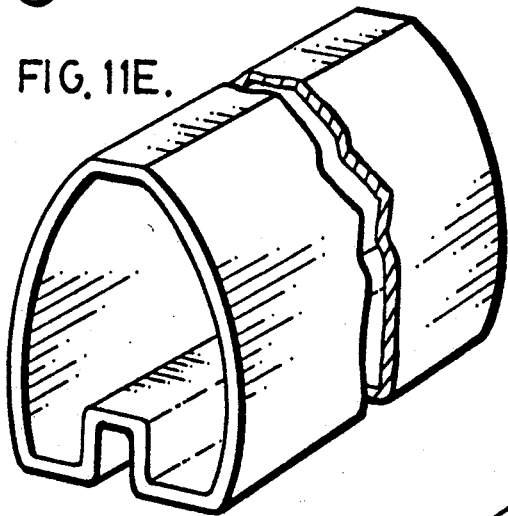
Figure 11F:
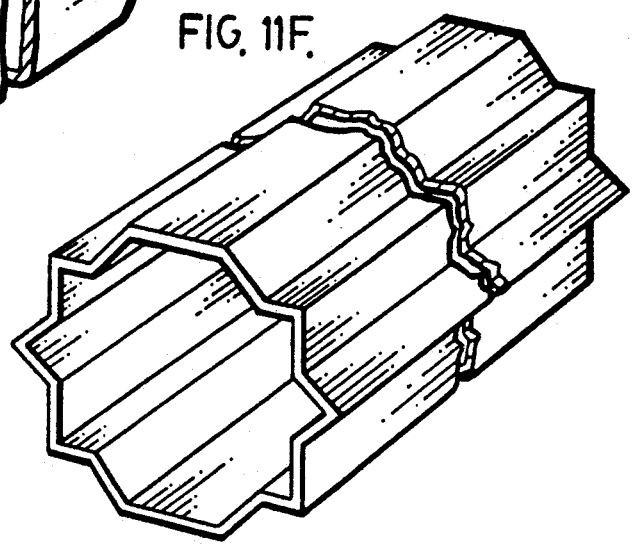

In FIG. 10 polygonal construction is illustrative of the use of the present invention in a geometric, nonrectangular frame.

In carrying out the assembly of differing frame configurations, the respective side members of which are mutually inclined other than at right-angles as in the case of the FIG. 10 polygonal construction, the foregoing assembly procedure may require to be modified. In the extreme it may prove desirable or even necessary to assemble all joints simultaneously, symmetrically and uniformly.

The assembly of frame joints is facilitated by the flexibility of the joining member 28, and the slenderness thereof, both of these characteristics permitting considerable temporary elastic deformation during the assembly process. In the FIG. 10 embodiment the included angle of joining member 28 is substantially the same as the corresponding angle between respective adjoining members 24.

It will be understood that changes may be made to the disclosed embodiments, within the scope of the following claims.

The embodiments of the invention in which an exclusive property or privilege is claimed are defined as follows:

1. In an aperture-closing frame construction, a corner joint having a first frame member and a second frame member, each member being of hollowed closed section terminating in mutually bevelled planar relation, with complementary angles of bevel, to form a tight, abutting joint having a predetermined included angle of variable size therebetween; the extruded sections forming mutually inclined closed channels having wall portions of the respective channels in mutually inclined substantially adjoining relation to provide substantially continuous inner peripheral and outer peripheral surfaces; a first joining member for insertion within said channels in oriented relation therebetween, comprising solely a planar strip having four adjoining, mutually inclined leg portions to provide a resilient open W-form, the two centre leg portions of the W-form, being mutually inclined substantially at said included angle, being mutually angularly adjustable for abutting a said section peripheral surface, in corner maintaining relation therewith; the other leg portions of said resilient W-form each extending from the respective adjoining centre leg portion at an acute included angle, in inclined pressing relation against a respective other said peripheral surface and having a sharp, transversely extending edge portion to contact said other peripheral surface in effective cutting contact therewith, to jam said W-form in nonwithdrawable, corner maintaining relation therewith, so as to retain said frame members in secured, joined relation.

2. The frame construction as set forth in claim 1, said joining member comprising a rectangular strip having said four leg portions joined by laterally extending bends in said strip.

3. The frame construction as set forth in claim 2, with said outer leg portions being fastened in surface joined relation with inner wall portions of said channel.

4. The frame construction as set forth in claim 3, having a second said joined member mounted within said channels in sandwiched relation with said first joining member, to secure said first joining member in contacting relation with adjacent inner surfaces of said channels.

* * * * *